Figure 1:
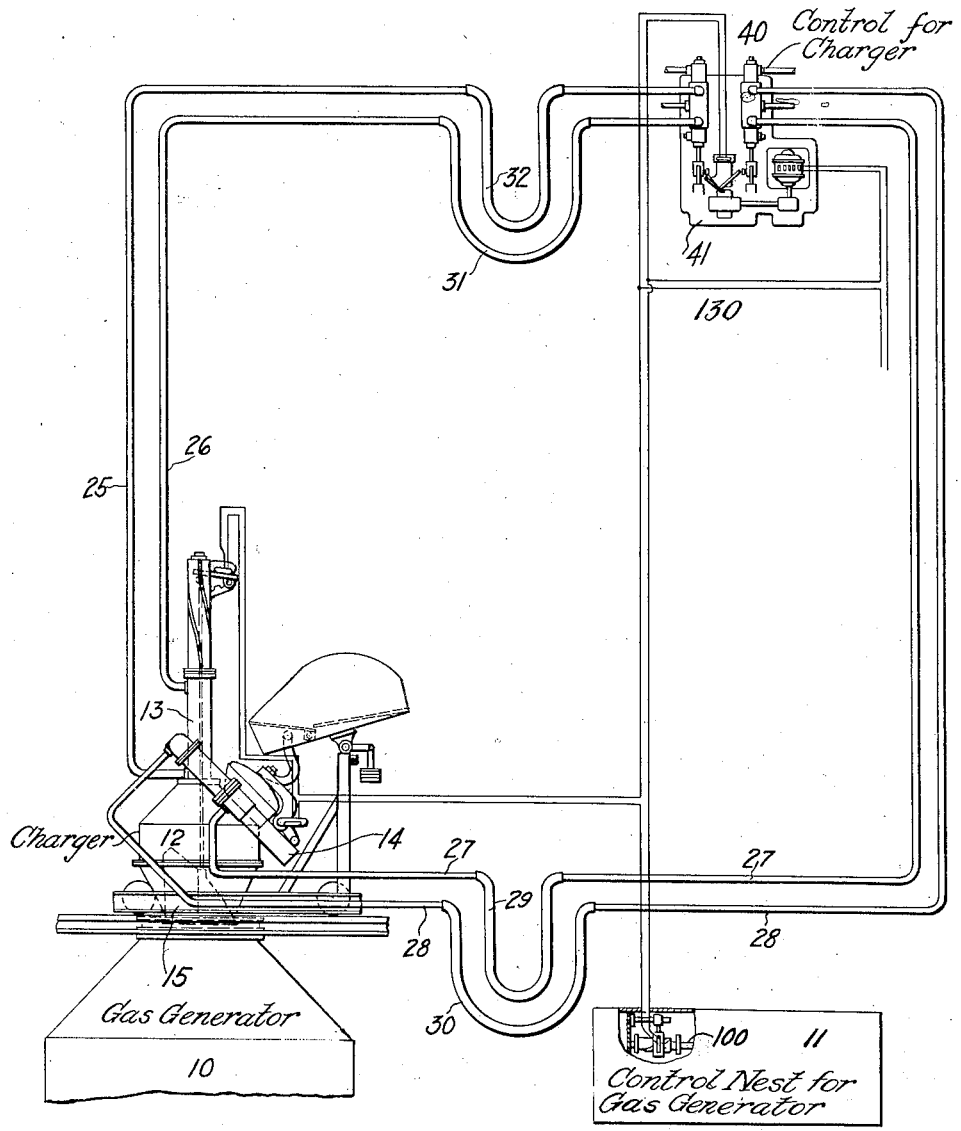

Aug. 14, 1934.    G. R. STEERE    1,970,155
CONTROL FOR CHARGING MACHINES
Original Filed Sept. 13, 1928    3 Sheets—Sheet 1

GEORGE R. STEERE
INVENTOR

BY Forbes Sibley
ATTORNEY

Aug. 14, 1934.         G. R. STEERE         1,970,155
CONTROL FOR CHARGING MACHINES
Original Filed Sept. 13, 1928     3 Sheets-Sheet 2
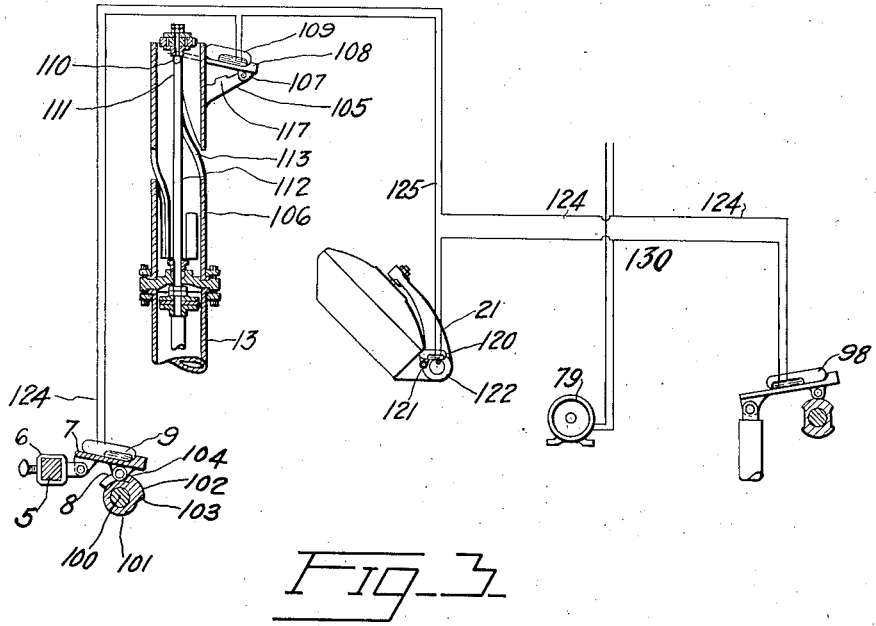
Fig_3
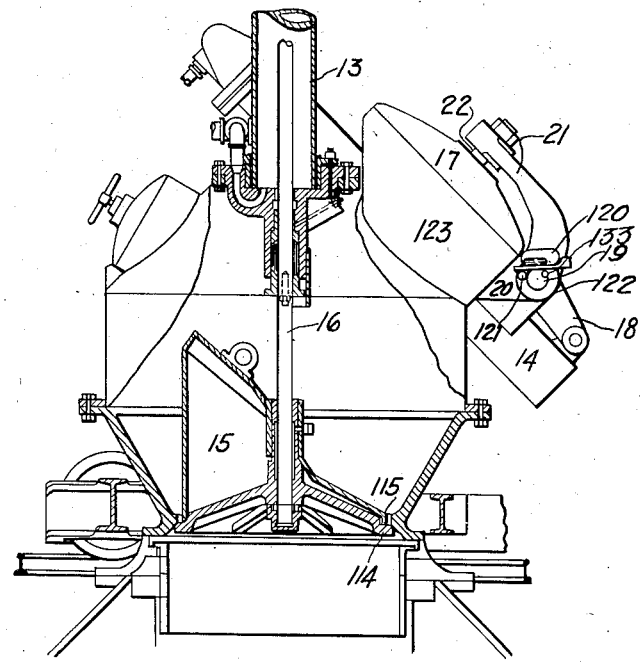
Fig_2
GEORGE R. STEERE
INVENTOR
BY Forbes Silsby
ATTORNEY Aug. 14, 1934.                G. R. STEERE                1,970,155
                      CONTROL FOR CHARGING MACHINES
                Original Filed Sept. 13, 1928      3 Sheets-Sheet 3

GEORGE R. STEERE
INVENTOR

BY Forbes Silsby
ATTORNEY

Patented Aug. 14, 1934

1,970,155

UNITED STATES PATENT OFFICE 1,970,155

CONTROL FOR CHARGING MACHINES

George R. Steere, West Hartford, Conn., assignor to Semet-Solvay Engineering Corporation, New York, N. Y., a corporation of New York Application September 13, 1928, Serial No. 305,848
Renewed January 30, 1934

16 Claims. (Cl. 48—86)

This invention relates to control devices and more particularly to control devices adapted for use on charging machines that supply fuel to gas generators. While the invention is shown and described herein in connection with a charging machine mounted on a generator of a water gas set it will be understood that the invention is not limited thereto but may be used in connection with a charging machine for other gas generators and also with other apparatus.

One object of the present invention is to provide a control device adapted for use in connection with a charging machine that will permit the automatic operation of the charger in synchronism with the operation of the generator and insure the proper operation of the charger thereby eliminating danger of accidents such as explosions in the charging machine.

As pointed out in my co-pending application Serial No. 201,501, filed June 25, 1927, it is desirable in the generation of water gas to maintain the conditions of operation, particularly conditions in the fuel bed, uniform in order that variations in the product be avoided. Accordingly, charging machines have been developed, for example, as illustrated in the patent to Steere 1,608,680 granted November 30, 1926, which admit small charges of solid fuel at frequent intervals whereby the chilling effect and objectionable changes in the fuel bed due to the fresh charges of fuel are minimized. For uniform gas production conditions, the fuel bed should be substantially the same for each run period of the generator, that is, the time cycle for charging the fuel should be regular and, for the best results, in synchronism with that of the generator operation. However, with a manual control of the charger there is no assurance of regularity of operation nor is it practical to maintain the operation in synchronism with the generator; and, if the operator's attention is distracted for but a brief period, the resulting change in the charging period may materially affect the quality of the gas produced.

According to the invention disclosed in my co-pending application Serial No. 201,501, a regularity of the charging cycle is obtained by automatically controlling the charging mechanism, and its synchronous operation with that of the generator is secured by associating the charger control with the control nest with which the water gas generator set is usually equipped for automatically operating the valves that determine the blast and run periods. The automatic control of the charger is obtained by providing motors for operating the movable elements, such as hydraulic cylinders or motors shown in the patent to Steere above mentioned, and control valves in the pipe lines leading to the motors. These valves can be operated to cause the operation of the hydraulic cylinders or motors at regular intervals by a power drive, such as an electric motor, through a suitable mechanism.

For operating the charger control in synchronism with the gas generator set, a switch mechanism is preferably included in the generator control nest for starting the electric motor of the charger control at correct intervals; and a second switch mechanism connected in parallel therewith is preferably mounted in the charger control to insure a complete operation of the hydraulic cylinders or motors. Owing to variations in the character and size of the coal and other causes, blow holes or other defective conditions may occur in the fuel bed; provision is therefore made so that the charger can be manually operated to correct such conditions without affecting the automatic control or its regularity of operation.

It has been found that at times due to fluctuations in the pressure source of the pressure fluid operating the hydraulic cylinders or motors of the charging machine, the movable parts of the charging machine, i. e., the fuel spreading device and the cover for the magazine do not complete their cycles of operation and are consequently not returned to their normal or closed positions. Also, due to the presence of fuel or other material on the seating flange of the fuel spreading device, or on the seat for the fuel spreading device, or on the cover for the magazine of the charging machine, the proper seating of these members is prevented. If the fuel spreader is not returned to closed position upon the completion of the stroke of the operating hydraulic cylinder interference occurs with the proper operation of the charger and also an explosive mixture of gas and air may be formed by gas leaking from the generator into the magazine of the charger. Also, if the cover is not returned to closed position, air enters the magazine of the charger, interfering with the proper operation thereof.

According to the present invention a switch is associated with the spreading device of the charger and a second switch with the cover of the magazine. The two switches are connected in series with the switch associated with the control nest and are so positioned and mounted that they are in closed position only when the fuel spreading device and cover are in definite predetermined positions, i. e., when the fuel spreading device is in normal or seated position, so that the spreader is seated in the magazine of the charger and serves as a closure for the charging opening in the generator, and the cover is in closed or seated position on the fuel nozzle of the magazine.

In accordance with this invention if the charger completes an operation i. e., a complete reciprocation of the spreader or an opening and closing of the cover, so that the switch associated with the charger control is opened and the fuel spreading device or cover has not properly or completely returned into seated position, the operation of the charger is automatically and immediately stopped. By completing the seating of the cover or the spreading device, as the case may be, the switches associated therewith are closed and the operation of the charger is then automatically initiated from the control nest for the gas generator. The stoppage of the charger upon failure of the cover or fuel spreader to return to seated or closed position during each charging operation permits immediate closure and correction of the cause of the failure of the proper operation of these members, consequently preventing the formation of an explosive mixture in the magazine of the charger and insuring proper operation thereof.

The invention accordingly comprises a gas generator and charger therefor, a control nest for regulating the operation of the generator and a control for the charger connected with the control nest to synchronize the operation of the charger with that of the generator and operative to insure the proper operation of the charger.

Figure 4:
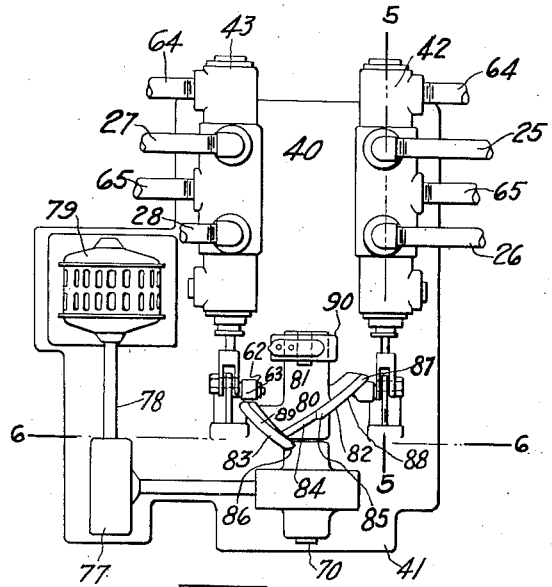
Figure 5:
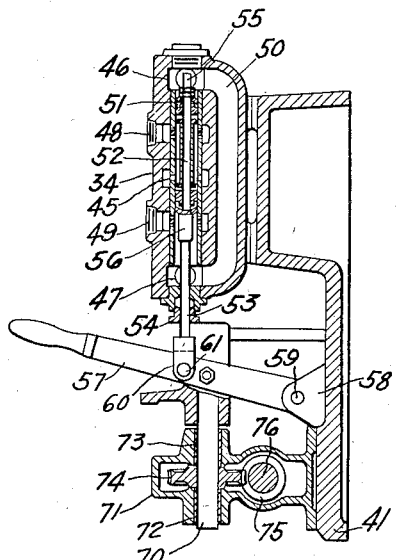
Figure 6:
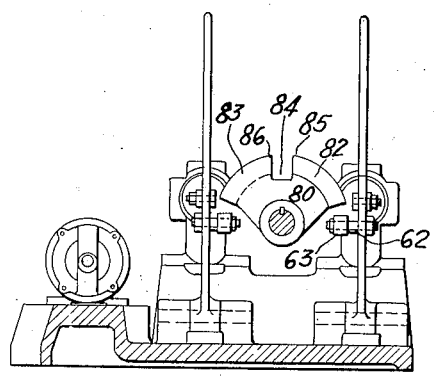
Figure 7:
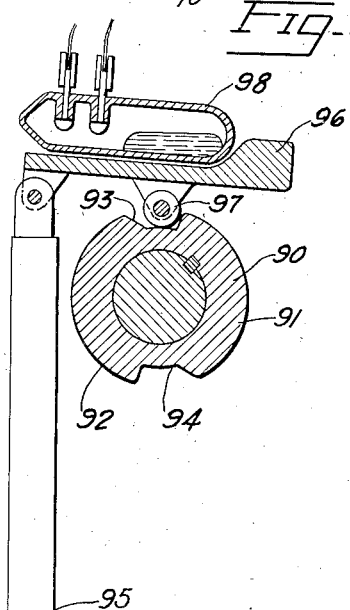

Other objects and advantages will appear from the following detailed description taken in connection with the accompanying drawings in which Fig. 1 is a diagrammatic illustration of a preferred embodiment of the invention showing a charger mounted in charging position on a generator, fragmentarily shown; Fig. 2 is a fragmentary elevation partly in section of a charging machine positioned over the charging opening of a gas generator; Fig. 3 is a diagrammatic illustration showing the circuit comprising the switches of the control nest and charger control, and the switches associated with the fuel spreader and cover for the magazine; Fig. 4 is an enlarged plan view of a portion of the charger control; Fig. 5 is a section on the line 5—5 of Fig. 4; Fig. 6 is an elevation partly in section on the line 6—6 of Fig. 4; and Fig. 7 is a detail elevation partly in section of the switch mechanism associated with the charger control.

Referring to Fig. 1, 10 indicates a fragmentary detail portion of a gas generator of a water gas set, a control nest for regulating the cycle of operation of the generator being diagrammatically indicated in the same figure by the reference numeral 11. The invention is applicable to any type of generator or other apparatus and to any suitable type of control nest for such apparatus. Accordingly, these constructions which are well known in the art are merely indicated to the extent necessary to show the relation of the present invention thereto.

Above the generator is mounted a charger 12 of any suitable character preferably of the type shown in the patent to Steere above mentioned, which includes two hydraulic cylinders or motors 13, 14 for operating the movable parts of the charger, motor 13 operating the fuel spreader 15 bolted or otherwise secured to the piston rod 16 of the hydraulic cylinder 13. The motor 14 operates the cover or lid 17 through link 18 one end of which is pivotally secured to the piston rod of the hydraulic cylinder 14, and the other end is keyed to a shaft 19 supported in brackets 20. A lever 21 has one end keyed to shaft 19 and the other end secured to the cover 17 by a nut on a pin 22 integral with or fastened to the cover. Pipe lines 25, 26 lead to the motor 13 and pipe lines 27, 28 lead to the motor 14 for conveying and removing the water or other operating pressure fluid. These pipe lines include flexible or hose portions 29, 30, 31 and 32 so that the charger, which is supported by a carriage, can be moved from its position over the generator opening.

The pipe lines are connected to a charger control or timing device 40 comprising a base 41 on which are mounted two reciprocating four-way valves 42, 43. Each valve consists of a cylindrical casing 34 with a middle port 45, end ports 46, 47 and intermediate ports 48, 49, the end ports being connected by a passage 50. An elongated piston 51, slidable within the cylinder, has a reduced middle portion 52 so that communication can be established between the middle port and either one of the intermediate ports, depending upon the position of the piston. A valve stem 53 extends from the piston through a stuffing box 54, and the piston travel is limited by a projection 55 extending from the piston and a collar 56 formed on the stem. An operating lever 57 is pivoted to the lugs 58 extending from the base by a pin 59 and to a yoke 60 on the valve stem by a bolt 61. A stub shaft 62 extends from one side of the lever 57 and a roller 63 is journaled on the shaft.

The intermediate ports of the valve 42 are connected to the pipe lines 25, 26 while the intermediate ports of the valve 43 are connected to the pipe lines 27, 28. An end port of each valve is connected to a discharge line 64 and the middle port to a supply pipe 65. Since the end ports are connected by the passage 50, liquid is discharged from both end ports through the single connection 64.

The valves 42, 43 are mounted in parallel relation upon the base with the stub shafts 62 extending toward each other. Midway between the valves there extends a shaft 70 (Fig. 5) in parallel relation to the valves and supported from a housing 71 having journal bearings 72, 73 in which the shaft rotates. The housing is secured to the base 41 and encloses a worm gear 74 carried by the shaft 70 and a worm 75 engaging the gear. The drive shaft 76 of the worm connects with another similar reduction gearing enclosed in a housing 77, and the shaft 78 of the second gearing is driven by an electric motor 79.

The shaft 70 carries a cam 80 of a diameter sufficiently large to extend into the paths of movement of the rollers 63 connected to the valve stems. The cam comprises a hub 81 with which there are formed integrally two helical segments or blades 82, 83 of opposite pitch. These segments are spaced axially of the hub to leave a space 84 between their contiguous ends 85, 86 so that the roller 63 can pass between them. The other end 87 of the cam segment 82 is so located that upon rotation the cam surface 88 of the segment 82 will engage the roller 63 in the extreme position of the piston, as shown in Fig. 5; and the segment 82 is of sufficient extent and pitch to cause a complete travel of the piston in one direction as the surface 88 rotates in engagement with the roller 63. The other cam segment 83 is located with its surface 89 in position to engage the roller 63 as left by the segment 82, and it has a reverse pitch and an extent sufficient to return the piston to its original position as the surface 89 contacts with the roller 63.

It will be noted from Fig. 6 that cam segments 82 and 83 together subtend an arc of about 90 degrees. There is thus provided a complete back and forth reciprocation of one control valve during one-quarter revolution, a dwell during the next quarter revolution, and then a complete reciprocation of the other control valve during the third quarter revolution with another dwell period for the fourth quarter of each revolution of the cam shaft 70. The space 84 between the cam segments not only provides a passage between them for the roller 63 but also a sufficient time interval between the back and forth movements of the piston of the valve so that the mechanism controlled by the valve can function properly.

Upon the hub 81 of cam 80 is formed a cylindrical cam 90 having the two oppositely disposed cam surfaces 91, 92 separated by depressions 93, 94. A standard 95 threaded into the base 41 has a mercury switch support member 96 pivotally mounted at the upper end and is provided with a roller 97 adapted to contact with the cam 90. A mercury switch 98 is supported by the member 96.

The control nest 11, as usually constructed, has a shaft 100 from which the various control elements assembled in the nest are operated. Upon this shaft 100 (Fig. 1), is fastened a split cylindrical sleeve 101. The sleeve is provided with a wedge shaped cam surface 102, one edge 103 being parallel with the axis of the sleeve and the other edge 104 extending helically about the sleeve. A rod 5 carries a slidable clamp 6 which has pivoted thereto a supporting member 7. Member 7 supports a mercury switch 9 and has a roller 8 extending therefrom into contact with the cam surface 102.

A bracket 105 is preferably fastened to a housing 106 extending from the top portion of the hydraulic cylinder 13 and has pivoted thereto at 107 a switch supporting member 108 provided with a mercury switch 109. Member 108 extends back of the housing 106 as shown in dotted lines (Fig. 3) and is arranged to be contacted by a pin 110 secured to or formed integral with the top portion 111 of rod 112 which is operatively fastened to the piston rod of the hydraulic cylinder 13 and is reciprocated thereby. Pin 110 travels in slots 113 formed in the housing 106 whereby the piston rod is partially rotated on each reciprocation so that the fuel spreader delivers a charge to a predetermined portion of the fuel bed in the generator. When the spreader 15 is in seated or closed position so that the flange 114 thereof contacts with the seat 115 in the magazine of the charger, the pin 110 maintains the switch support 108 in upward position so that the switch 109 is closed. Upon descent of the piston rod the switch support gravitates downwardly causing the mercury in the switch 109 to flow towards the left (Fig. 3) opening the switch. Downward movement of the switch is limited by a stop 117 formed integral with the bracket support 105.

Another mercury switch 120 is pivoted on a pin 121 secured to a collar 122 which preferably serves as a bearing for shaft 19. This switch is so positioned on the collar 122 that when the cover is in seated position the switch 120 is closed and movement of the operating arm 21 to open the cover 17 rocks the shaft 19 and swings pin 133 on shaft 19 to open the switch 120. If the cover 17 is not completely seated on the fuel nozzle 123 of the magazine, the switch 120 remains open.

As shown in Fig. 3 the switches 98 and 9 are connected in parallel with the electric motor 79 by conductors 124 and the switches 109 and 120 are connected in series with the switch 9 by conductors 125 forming a circuit indicated generally by the reference numeral 130.

At the commencement of operation with the fuel spreader and cover in closed position the charger is started in operation through the cam surface 102, fastened on shaft 100 which preferably rotates continuously during the operation of the water gas set, engaging the roller 8 to lift the mercury switch 9 and thus close the circuit to the electric motor 79. The motor thereupon rotates the cam shaft 70 and the cam surface 91 lifts the mercury switch 98 to close the circuit to the switch 98 associated with the charger control. The cam surface 88 then engages the roller 63 of the valve 42 and the piston is drawn forward in position shown in Fig. 4 to connect the supply line 65 with the pipe line 26 through the ports 45, 49 and connecting pipe line 25 with the discharge 64 through ports 48, 46. Liquid is thus applied under pressure to the hydraulic motor 13 through the line 26 to depress the piston contained therein, the liquid on the under side of the piston escaping through the line 25 of the valve ports 48, 46 and outlet pipe 64; the fuel spreader is thus lowered into the generator and a charge of fuel contained in the charger is directed by the spreader into the generator. As the fuel spreader is lowered the switch 109 is opened by the pivotal descent of switch support 108. The cam surface 89 next comes into contact with the roller 63 of the valve 42 to return the valve piston and so connect the line 25 with the supply line 65, and the line 26 with the discharge 64. The spreader is thus raised by the hydraulic motor 13 to close the bottom opening of the magazine, and the piston rod in its upward movement contacts with the switch support 108 and closes the switch 109.

When the cam 80 is rotated out of contact with the roller 63 of the valve 42, the depression 93 on the cam 90 rotates beneath the switch member 96 permitting the latter to drop and thus break the circuit. However, if the other switch member 7 is still riding on the cam surface 102 the circuit remains closed and the motor continues to rotate the cam shaft 70 and so reestablishes the circuit through the switch 98 by the cam surface 92 lifting the switch member 96. The other control valve 43 is thereupon operated by the cam 80 to cause the hydraulic motor 14 to pass through a complete cycle of operation opening the cover, and after a charge of fuel has been dumped into the magazine, in accordance with the usual operation of the charging device described in detail in Patent No. 1,608,680, hereinabove mentioned, closing the cover. The opening of the cover opens switch 120 which is closed by the return of the cover to seated position. If, during the operation of replenishing the charger, the cam surface 102 in the control nest allows the switch member 7 to drop and open the switch 9, the motor continues to operate due to the maintenance of the closed circuit through the switch 98 until the cam surface 92 passes beneath the roller 97 and the latter falls into the depression 94. With switches 9 and 98 open and switches 109 and 120 closed due to the proper seating of the spreader and cover, the motor 89 stops and does not start again until the circuit is closed once more through the switch 9 of the control nest. It will be noted, however, that for each valve operation the switch 98 is operated to keep the circuit closed during a complete back and forth reciprocation of a control valve and therefore the hydraulic motors 13, 14 usually complete their cycles for each charging operation.

However, if the fuel spreader or the cover are not returned to seated position the switches 109 and 120, as the case may be, remain open. Upon the opening of switch 98 by the roller 97 falling into the depressions 93 or 94, the motor 89 is automatically stopped due to the open circuit caused by the open switch 109 or 120. As the switch 98 is maintained closed by cam surface 92 and is opened only at the completion of each charging operation, i. e., a complete reciprocation of the spreader to deliver a charge and be returned to closed position or the opening of the cover 17, dumping a charge into the magazine and closing of the cover 17, the switches 109 and 120 are normally closed at the completion of each charging operation and the operation of the charger is not interrupted. Upon interference with the proper operation of the fuel spreader or the cover, as for example a fluctuation in the pressure source of the pressure fluid operating the hydraulic cylinders or the presence of coal or other material on the seats for the fuel spreader or cover preventing proper closure of these members, either or both switches 109 and 120 remain open upon the completion of the charging operation and accordingly the motor 79 and the operation of the charger is immediately stopped. The operator may at once make any desired or necessary adjustments to close the fuel spreader or cover or both.

With cam segments 82, 83 proportioned to subtend an arc of about 90 degrees, each valve stem is contacted by the cam during a quarter revolution only, and for the remaining three quarters of a revolution the valve stem is free to be reciprocated manually by the lever 57. During the dwell periods when neither stem is contacted by the cam, both valve stems can thus be manually operated. This feature is of importance as it permits the operator to control the position of the spreader, for example, to regulate the deposit of fuel in the generator to correct conditions in the fuel bed.

The sleeve cam member 101 is adjustable on the control nest shaft 100 so that the charger can be started at any desired point in the gas generator cycle. By shifting the member 7 axially along the cam 102 the number of charging operations for each cycle of the gas generator set can be varied. For example, the wedge-shaped cam 102 can be proportioned so that with the switch at its small or narrow end, the motor will only operate one of the control valves 42 or 43 for each cycle of the generator, that is, a fuel charge will be delivered into the generator only once in every two cycles of the generator, and, with the switch at the broad end of the cam, several charges of fuel will be delivered for each two cycles of the generator operation.

In view of the wide range in the number of charges for each generator cycle permitted by the present invention, one size of charger is in practice sufficient to take care of any size generator.

The charger control is disclosed as including two four-way hydraulic valves because of the fact that the charger is provided with two hydraulic cylinders or motors. The invention, however, is applicable to a one-valve control or to a control having more than two valves by duplicating the cam structure or modifying the cam surface to accord with the disposition of the valves, as will be obvious to one skilled in the art. Furthermore, while valves are shown other equivalent devices may be substituted where motors other than hydraulic are used for operating the charger elements.

It will of course be understood that while a specific embodiment of the invention has been shown and described, various changes in the details thereof may be made by those skilled in the art, and the invention is not to be limited to the structure disclosed, but only by the scope of the appended claims.

What is claimed is:

1. In combination with a control nest for automatically regulating the operation of a gas generator, a charger, a control for said charger, means associating the control nest with the charger control for initiating the operation of the charger from the control nest, and means for preventing the initiation of the operation of the charger when an operating part of said charger is not in a predetermined position.

2. In combination with a control nest for regulating the operation of a gas generator, a charger comprising a magazine, a fuel spreading device in said magazine, a gate for said magazine, a control for said charger, means associating the control nest with the charger control to synchronize the operation of said charger with that of the generator, and means preventing the operation of the charger control when said gate or fuel spreading device is not in a predetermined position.

3. In combination with a control nest for regulating the operation of a gas generator, a charger, a control for said charger arranged to cause said charger to complete a predetermined number of charging operations during each cycle of operation in the generator, means associating the control nest with the charger control to synchronize the operation of the charger with that of the generator, said control comprising means for completing a charging operation when the control nest acts to stop the operation of said charger, and means for insuring the proper operation of said charger.

4. In combination with a control nest for automatically regulating the operation of a gas generator, a charger comprising a magazine, a cover for said magazine, a control for said charger, means associating the control nest with the charger control to initiate the operation of the charger from the control nest when said cover is in closed position.

5. In combination with a control nest for automatically regulating the operation of a gas generator, a charger comprising a fuel spreading device of a control for the charger, an electric motor, for operating said control, a switch associated with the control nest and a second switch associated with said fuel spreading device in circuit with said first named switch and said motor.

6. In combination with a control nest for automatically regulating the operation of a gas generator, a charger comprising a magazine and a cover for said magazine of a control for the charger, a switch associated with said cover, an electric motor for operating said control, a second switch associated with the control nest and a third switch associated with said motor in circuit with said switches.

7. In combination with a control nest for regulating the operation of a gas generator, a charger comprising a magazine, a fuel spreading device arranged to move in said magazine and a cover for said magazine, of a control for the charger, an electric motor for operating said control, a switch associated with the control nest and switches associated with the fuel spreading device and the cover connected in circuit with said first named switch and said motor.

8. In combination with a control nest for automatically regulating the operation of a gas generator, a charger comprising a fuel spreading device, of a control for the charger, an electric motor for operating said control, a pair of switches connected in circuit with said motor, one of said switches being associated with the control nest and the other with the charger control, and an additional switch associated with the fuel spreading device connected in series with the switch associated with the control nest.

9. In combination with a control nest for regulating the operation of a gas generator, a charger comprising a magazine and a cover for said magazine, of a control for the charger, an electric motor for operating said control, a pair of switches connected in circuit with said motor, one of said switches being associated with the control nest and the other with the charger control, and an additional switch associated with the cover and connected in series with the switch associated with the control nest.

10. In combination with a control nest for automatically regulating the operation of a gas generator a charger comprising a magazine, a fuel spreading device arranged to move within said magazine and a cover for said magazine, of a control for the charger, an electric motor for operating said control, a pair of switches connected in circuit with said motor, one of said switches being associated with the control nest and the other with the charger control and an additional pair of switches associated with the fuel spreading device and the cover and connected in series with the switch associated with the control nest.

11. A control device including, in combination, a control element, a cam for operating said element, a motor for operating said cam, a switch in circuit with said motor, means associated with said cam for operating said switch, a second switch in circuit with said motor and connected in parallel with the first named switch and a third switch connected in series with said second named switch.

12. A control device including, in combination, a control element, a cam for operating said element, a motor for operating said cam, a switch in circuit with said motor, means associated with said cam for operating said switch, a second switch in circuit with said motor and connected in parallel with the first named switch, and an additional pair of switches connected in series with said second switch.

13. In combination with a charging machine having a fuel spreading device, a control for said spreading device comprising a control element, a cam for operating said element, a motor for operating said cam, a switch in circuit with said motor, means associated with said cam for operating said switch, a second switch in circuit with said motor and connected in parallel with the first named switch and a third switch associated with the fuel spreading device and connected in series with said second named switch.

14. In combination with a control nest for regulating the operation of a gas generator, a charging machine for the generator comprising a fuel spreading device, a control for the charging machine comprising a control element, a cam for operating said element, a motor for operating said cam, a switch in circuit with said motor, means associated with said cam for operating said switch, a second switch associated with the control nest in circuit with said motor and connected in parallel with the first named switch and a third switch associated with said fuel spreading device and connected in series with said second named switch.

15. In combination with a control nest for regulating the operation of a gas generator, a charging machine for the generator comprising a magazine, a cover for said magazine, a control for the charging machine comprising a control element, a cam for operating said element, a motor for operating said cam, a switch in circuit with said motor, means associated with said cam for operating said switch, a second switch associated with the control nest in circuit with said motor and connected in parallel with the first named switch and a third switch associated with said cover and connected in series with said second named switch.

16. In combination with a control nest for automatically regulating the operation of a gas generator and provided with an operating shaft, of a charger including a magazine, a fuel spreading device arranged to move in said magazine and a cover for said magazine, a pair of hydraulic motors for operating said fuel spreading device and for removing and replacing said cover, a pair of reciprocating valves in parallel disposition, one for each motor and connected thereto by pipe lines, said valves having their stems extending in the same direction, projections on said stems extending toward each other and adapted to move with the stems, a shaft mounted in parallel relation midway between the stems, a cam carried by said shaft of a diameter extending into the paths of movement of said projections, said cam including a hub and helically formed segments of opposite pitch with their contiguous ends spaced axially on the hub to provide a passage for said projections, an electric motor for driving said cam, a second cylindrical cam, a member pivoted to a standard adjacent said second cam and having a projection in contact with said cam, a mercury switch supported on said member for movement therewith, a sleeve secured to the shaft of the control nest, said sleeve having a wedged-shaped cam surface thereon, a clamp slidably supported for movement axially of said sleeve, a member pivoted to said clamp and having a projection in contact with said sleeve, a second mercury switch supported on said last mentioned member for movement therewith, a circuit connecting said switches in parallel with each other and in circuit with said motor and mercury switches associated with the fuel spreading device and the cover and connected in series with said second mentioned mercury switch.

GEORGE R. STEERE.